United States Patent
Eruchimovitch et al.

(10) Patent No.: US 10,133,411 B2
(45) Date of Patent: Nov. 20, 2018

(54) AUTO-CORRECTION FOR MOBILE RECEIVER WITH POINTING TECHNOLOGY

(75) Inventors: Baruch Eruchimovitch, Haifa (IL); Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1588 days.

(21) Appl. No.: 12/814,340

(22) Filed: Jun. 11, 2010

(65) Prior Publication Data

US 2011/0304537 A1    Dec. 15, 2011

(51) Int. Cl.
*G09G 5/08*    (2006.01)
*G06F 3/041*    (2006.01)
(Continued)

(52) U.S. Cl.
CPC ........ *G06F 3/0418* (2013.01); *G06F 3/03545* (2013.01); *G06F 3/043* (2013.01)

(58) Field of Classification Search
CPC .. G06F 3/03545; G06F 3/0304; G06F 3/0433; G06F 3/043; G06F 3/038;
(Continued)

(56) References Cited

U.S. PATENT DOCUMENTS 5,144,594 A * 9/1992 Gilchrist ............... G06F 3/0346
178/18.04

5,174,759 A * 12/1992 Preston ................... A63F 13/02
434/307 R (Continued)

FOREIGN PATENT DOCUMENTS

CN    1784649 A    6/2006
EP    0622722 A2 * 11/1994
(Continued)

OTHER PUBLICATIONS

Fujitsu, Ultrasonic Electronic Pen, Sep. 2008, Copyright Fujitsu Laboratories Ltd.
(Continued)

*Primary Examiner* — Joseph Haley
*Assistant Examiner* — Emily Frank
(74) *Attorney, Agent, or Firm* — Kilpatrick Townsend & Stockton/Qualcomm (57) ABSTRACT

A mobile station and unattached work area is used with an electronic pen, which includes a transmitter, such as an acoustic transmitter. The mobile station includes a receiver that receives signals from the transmitter and orientation sensors that detect movement of the mobile station. The position of the receiver is calibrated with respect to the unattached work area. Data from the orientation sensors is received when the mobile station, and thus, the receiver is moved with respect to the work area. A transformation matrix is generated based on the data from the orientation sensors, which can be used to correct for the movement of the receiver. The position of the transmitter in the electronic pen is calculated and mapped based on received signals and the transformation matrix and the mapped position is then displayed.

30 Claims, 5 Drawing Sheets

(51) Int. Cl.
*G06F 3/0354* (2013.01)
*G06F 3/043* (2006.01)

(58) Field of Classification Search
CPC .......... H04N 2201/04712; H04N 2201/04717; H04N 2201/04734; B41J 29/313; B41J 2/315; B41J 3/316
USPC ................. 345/156, 179; 178/19.01–19.07
See application file for complete search history.

(56) References Cited

U.S. PATENT DOCUMENTS

| | | | |
|---|---|---|---|
| 5,902,968 A | 5/1999 | Sato et al. | |
| 6,157,368 A * | 12/2000 | Fager | 345/156 |
| 6,181,329 B1 * | 1/2001 | Stork et al. | 345/179 |
| 6,577,299 B1 | 6/2003 | Schiller et al. | |
| 6,906,703 B2 * | 6/2005 | Vablais et al. | 345/179 |
| 7,643,015 B2 * | 1/2010 | Paradiso | G06F 3/0433 178/18.04 |
| 8,817,017 B2 * | 8/2014 | Vaganov | B44D 2/002 345/419 |
| 8,847,922 B1 * | 9/2014 | Kurtz | G06F 3/0416 345/175 |
| 2004/0263479 A1 | 12/2004 | Shkolnikov | |
| 2006/0022942 A1 | 2/2006 | Lin | |
| 2006/0209043 A1 * | 9/2006 | Cohen | G06F 3/002 345/173 |
| 2007/0259685 A1 * | 11/2007 | Engblom | G06F 1/1626 455/550.1 |
| 2008/0180395 A1 * | 7/2008 | Gray | G06F 3/0346 345/157 |
| 2008/0305753 A1 * | 12/2008 | Stark | 455/91 |
| 2009/0009489 A1 | 1/2009 | Lee | |
| 2009/0040192 A1 * | 2/2009 | Haga | 345/174 |
| 2009/0073128 A1 * | 3/2009 | Marsden | G06F 3/0231 345/168 |
| 2009/0160824 A1 * | 6/2009 | Chih-Yung et al. | 345/175 |
| 2009/0187374 A1 | 7/2009 | Baxter et al. | |
| 2009/0233714 A1 * | 9/2009 | Toro | 463/39 |
| 2010/0033427 A1 * | 2/2010 | Marks et al. | 345/156 |
| 2010/0067674 A1 * | 3/2010 | Lee | G06F 3/03545 379/100.01 |
| 2010/0103243 A1 * | 4/2010 | Won | H04M 1/72555 348/14.02 |
| 2010/0279768 A1 * | 11/2010 | Huang | A63F 13/12 463/31 |
| 2011/0006982 A1 * | 1/2011 | Rhee | G06F 3/03545 345/157 |
| 2011/0109543 A1 * | 5/2011 | Das | G06F 1/1626 345/156 |
| 2011/0134055 A1 * | 6/2011 | Jung et al. | 345/173 |
| 2012/0263381 A1 * | 10/2012 | Yoshida | G06F 3/03545 382/189 |

FOREIGN PATENT DOCUMENTS

| | | | |
|---|---|---|---|
| EP | 0774708 A2 * | 5/1997 | |
| EP | 0840200 * | 5/1998 | |
| EP | 0840200 A2 | 5/1998 | |
| EP | 1041532 A2 * | 10/2000 | |
| JP | 2004227063 A | 8/2004 | |
| JP | 2004272310 A | 9/2004 | |
| JP | 2009080745 A | 4/2009 | |
| KR | 20080094779 A | 10/2008 | |
| WO | WO2008011361 * | 1/2008 | |
| WO | WO2008011361 A2 | 1/2008 | |

OTHER PUBLICATIONS

International Search Report and Written Opinion—PCT/US2011/040097—ISA/EPO—dated Dec. 20, 2011.

* cited by examiner

FIG. 1
(Conventional)

FIG. 2
(Conventional)

AUTO-CORRECTION FOR MOBILE RECEIVER WITH POINTING TECHNOLOGY

BACKGROUND

Figure 1:
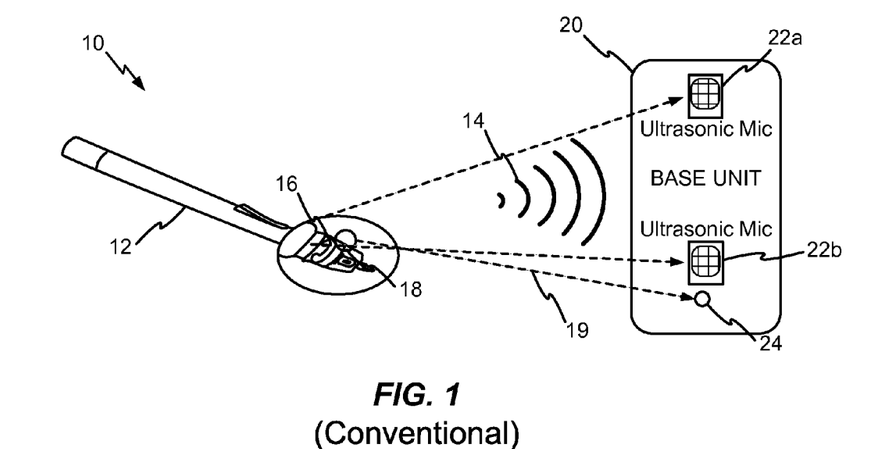
FIG. 1 illustrates a basic electronic pen system including a transmitter unit that emits acoustic signals and an acoustic receiver that receives the acoustic signals.

Electronic pens are pen shaped devices that may serve as a data input apparatus for a computer or the like. Electronic pens operate as a standard pen permitting the user to write on paper while transmitting acoustic signals that are received by a receiver and used to determine the position of the pen. FIG. 1, by way of example, illustrates a basic electronic pen system 10 including a transmitter unit 12 that emits acoustic signals 14, and a receiver 20 that receives the acoustic signals 14. The transmitter unit 12 is in the form of a writing instrument, such as a pen, and includes a transducer 16 for generating acoustic signals 14, such as ultrasonic signals. The transmitter unit 12 may also include a transmitter 18, which transmits an infra-red (IR) or radio frequency (RF) signal 19 including telemetry data, such as switch status, pen ID, etc., and a time stamp. The receiver 20 includes two microphones 22a, 22b that receive the acoustic signal 14, as well as an IR/RF receiver 24 that receives the IR/RF signal 19.

Figure 2:
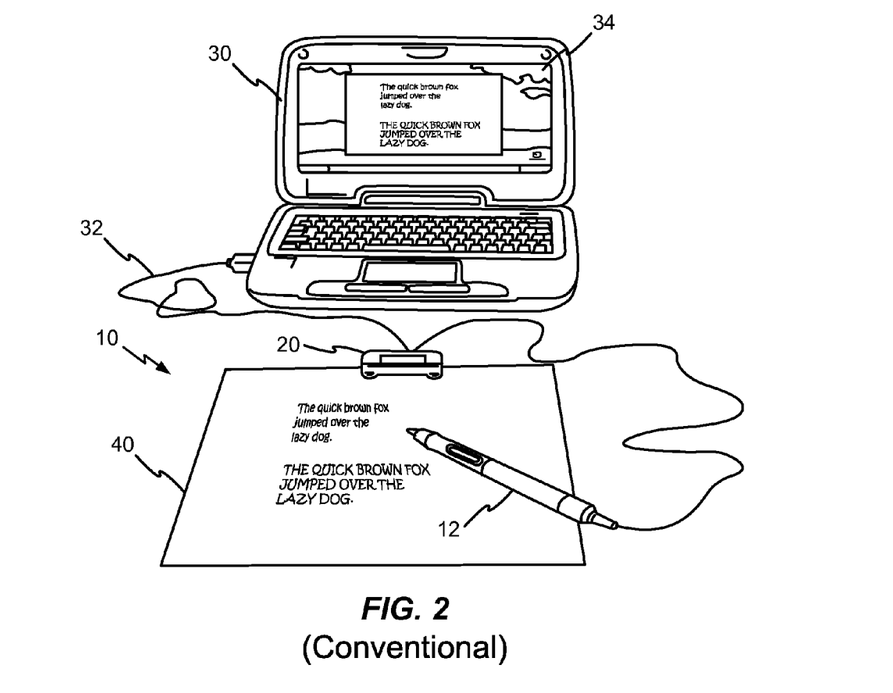
FIG. 2 illustrates the basic electronic pen system attached to a computer with the work area attached to the acoustic receiver.

FIG. 2 illustrates the electronic pen system 10 attached to a computer 30. The receiver 20 is attached to a work area 40 and is also attached to the computer 30 via cable 32. The work area 40 is the area to which the writing instrument will physically write, which is illustrated in FIG. 2 as paper. The receiver 20 is attached to the work area 40 by a clip or other secure means so that the work area 40 and receiver 20 are not moved with respect to one another during use. The position of the work area 40 with respect to the receiver 20, as well as the work area 40 size, is defined through calibration. The position of the receiver 20 with respect to the work area 40, thus, does not change until the work area 40 is detached from the receiver 20. The receiver 20 receives the acoustic signals from the transmitter unit 12, from which the position of the transmitter unit 12 can be determined with respect to the receiver 20. The computer 30 maps the position of the transmitter unit 12 in a display 34.

SUMMARY

A mobile station and unattached work area is used with an electronic pen, which includes a transmitter, such as an acoustic transmitter that may emit an ultrasonic signal. The mobile station includes a receiver for receiving signals from the transmitter and orientation sensors that detect movement of the mobile station. The position of the receiver with respect to the unattached work area is calibrated. Data from the orientation sensors in the mobile station is received when the mobile station and, thus, the receiver is moved with respect to the work area. A transformation matrix is generated based on the data from the orientation sensors, which can be used to correct for the movement of the receiver. The position of the transmitter in the electronic pen is calculated and mapped based on received signals and the transformation matrix and the mapped position is then displayed.

DETAILED DESCRIPTION

Figure 3:
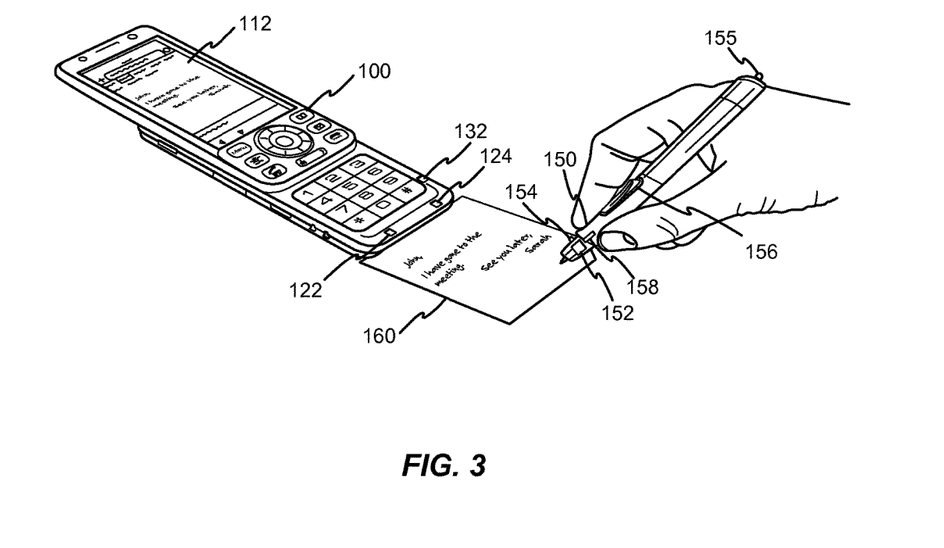
FIG. 3 illustrates a perspective view of a mobile station used with an electronic pen and an unattached work area.

FIG. 3 illustrates a perspective view of a mobile station 100 used with an electronic pen 150, which includes a transmitter 152 and an unattached work area 160. The transmitter 152 may be an acoustic transmitter, e.g., emitting an ultrasonic signal, and is thus, sometimes referred to herein as acoustic transmitter 152. It should be understood, however, that the transmitter 152 may transmit other types of signals, such as an electromagnetic signal or field, including light. The electronic pen 150 may also include an IR or RF transmitter 154, which transmits an infra-red (IR) or radio frequency (RF) signal including telemetry data, such as switch status, pen ID, etc., and a time stamp. The electronic pen 150 may also include a switch 156, which may be used to indicate when electronic pen 150 is being used to write. Alternatively, the electronic pen 150 may include one or more orientation sensors 158, such as accelerometers, to detect the position or movement of the electronic pen 150 and provide the information, e.g., either via IR/RF transmitter 154 or encoded on the signal transmitted by transmitter 152. Accelerometers 158, for example, may detect vibration caused by the electronic pen 150 being moved across the work area 160 and the detected vibration may be used to indicate when the electronic pen 150 is writing. The accelerometers 158 may also be used to detect jitter or other unintended vibration or movement during use, e.g., when in use in a vehicle. Additionally or alternatively, the electronic pen 150 may include a press sensor in the tip to determine when the electronic pen 150 is in use. The press sensor, orientation sensors 158, or switch 156 are useful to reduce power consumption by limiting the data flow to times when the electronic pen 150 is in use.

The mobile station 100 includes a receiver 120 for receiving signals transmitted by the transmitter 152 of the electronic pen 150. The receiver 120 may be an acoustic receiver with two or more microphones 122, 124 for receiving acoustic signals from the acoustic transmitter 152, and is thus, sometimes referred to herein as acoustic receiver 120. It should be understood, however, that the receiver 120 may receive other types of signals, such as an electromagnetic signal or field from transmitter 152, where the magnitude and/or vector of the sensed field may be used to determine the relative position of the transmitter 152. Mobile station 100 may also include an IR/RF receiver 132 for receiving an IR/RF signal from the IR/RF transmitter 154 of the electronic pen 150. If desired, one or both of the microphones 122, 124 may also be used to receive voice information, e.g., where the mobile station 100 is a cellular telephone. The mobile station 100 calculates the position of the electronic pen 150 based on the received acoustic signal and maps the position of the electronic pen 150 in a display 112 during use, as illustrated in FIG. 3. Because the work area 160 is unattached to the mobile station 100, no bulky or inconvenient clips or other attachment mechanisms are necessary. However, due to the mobility of the mobile station 100, distortion of the handwritten shapes may occur when the mobile station 100 moves with respect to the work area 160. Accordingly, orientation sensors within the mobile station 100 (shown in FIG. 6) may be used to compensate of movement of the mobile station 100 with respect to the work area 160. Moreover, orientation sensors within the mobile station 100 may be used to compensate of general movement of the mobile station 100, such as jitter. Further, when an orientation sensor, such as accelerometer 158 is used in the electronic pen 150, the mobile station 100 may use the received signals to compensate for extraneous sources of movement of the pen.

As used herein, a mobile station refers to a device such as a cellular or other wireless communication device, personal communication system (PCS) device, personal navigation device (PND), Personal Information Manager (PIM), Personal Digital Assistant (PDA), laptop or other suitable mobile device. Also, "mobile station" is intended to include all devices, including wireless communication devices, computers, laptops, etc. which are capable of communication with a server, such as via the Internet, WiFi, or other network. The mobile station 100 may access online servers using various wireless communication networks such as a wireless wide area network (WWAN), a wireless local area network (WLAN), a wireless personal area network (WPAN), and so on, using cellular towers and from wireless communication access points, or satellite vehicles. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Figure 4:
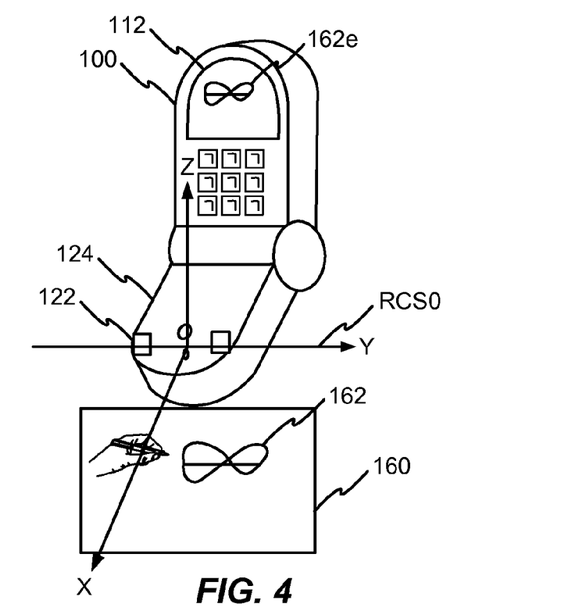
FIG. 4 illustrates a mobile station mapping and displaying of the position of an electronic pen on an unattached work area.

FIG. 4 illustrates the mobile station 100 mapping and displaying of the position of an electronic pen 150 on an unattached work area 160. The size of the work area 160, as well as the position of the work area 160 with respect to the acoustic receiver 120 in the mobile station 100, which includes microphones 122, 124, is provided by calibration. For example, after a user positions the mobile station 100 and the work area 160, the size and position of the work area 160 is calibrated by, e.g., sequentially pointing to predefined points in the work area 160 with the electronic pen 150, such as the four corners and center of the work area 160. The calibration process establishes the receiver coordinate system (RCS0) relative to the work area 160. Once the receiver coordinate system (RCS0) is established, the electronic pen 150 may be used to write on the work area 160 and the position of the acoustic transmitter 152 in the electronic pen 150 is calculated by the mobile station 100 based on RCS0 and mapped in the display 112. Calculation of the position of the acoustic transmitter 152 based on triangulation of the acoustic signals received by the two or more microphones 122, 124. The use of two microphones 122, 124 results in two potential positions for the transmitter, one of which corresponds to the work area 160. When the mobile station 100 does not move with respect to the unattached work area 160, the established receiver coordinate system (RCS0) remains accurate and the FIG. 162 written on the work area 160 is faithfully reproduced in the display 112 as electronic FIG. 162e.

Figure 5:
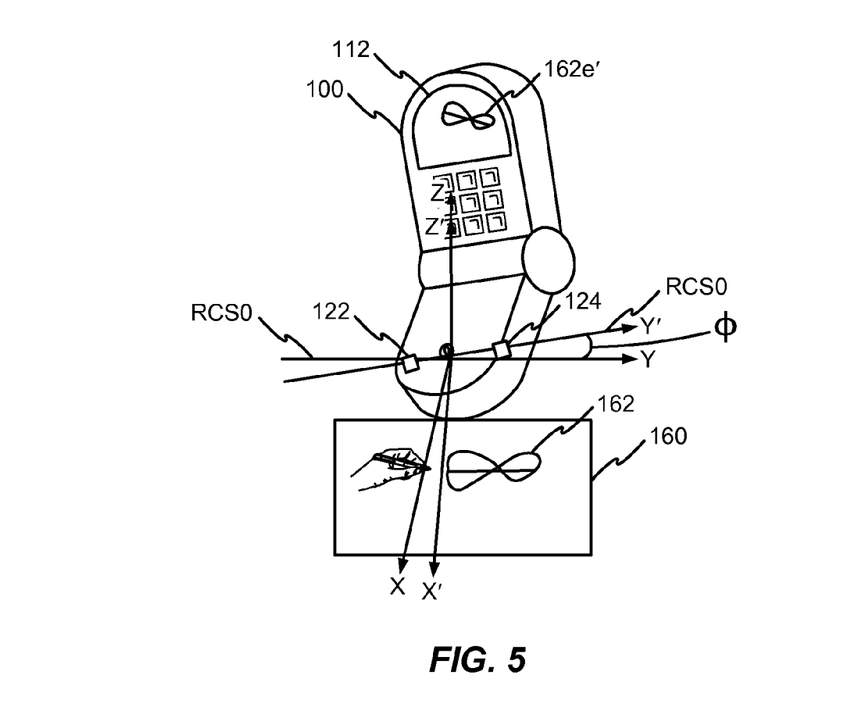
FIG. 5 is similar to FIG. 4, but shows the effect of moving the mobile station with respect to the unattached work area after calibrating the position of the acoustic receiver in the mobile station with respect to the unattached work area.

FIG. 5 is similar to FIG. 4, but shows the effect of moving the mobile station 100 with respect to the unattached work area 160 after receiver coordinate system (RCS0) has already been established. As illustrated, the mobile station 100, and thus, the acoustic receiver 120, has been rotated around the Z axis with respect to the unattached work area 160. Consequently, the initial receiver coordinate system (RCS0) is rotated by $\phi$ to the current receiver coordinate system (RCS1). Thus, when the electronic pen 150 is used to write the FIG. 162 on the work area 160, the position of the acoustic transmitter 152 in the electronic pen 150 is calculated by the mobile station 100 based on the established receiver coordinate system (RCS0) and the figure is incorrectly mapped in the display 112, as illustrated by electronic figure 162e'. While physically attaching the work area 160 to the mobile station 100 will prevent the undesired relative movement, the use of a physical connection mechanism, such as a clip, is bulky and inconvenient.

To avoid the distortion effects of moving the mobile station 100 from one position to another while using the electronic pen 150, orientation sensors, such as accelerometers and/or gyroscopes, within the mobile station 100 are used to correct for such movement. After calibration is used to establish the initial receiver coordinate system (RCS0), any movement of the mobile station 100 is detected by the orientation sensors, a transformation matrix (T1_0) is calculated based on data provided by the orientation sensors. The transformation matrix (T1_0) is used to transform the current receiver coordinate system (RCS1) after movement of the mobile station 100 to the initial receiver coordinate system (RCS0). For example, while the mobile station 100 is in a steady position (RCS1), the mobile station 100 may correct for the movement of the mobile station 100 with respect to the work area 160 by transforming each calculated point (Point1) into a result point (Point0) that is in the initial receiver coordinate system (RCS0), e.g., (Point0=T1_0*Point1). Alternatively, the transformation matrix (T1_0) may be used to transform previously mapped points, which were mapped in the initial receiver coordinate system (RCS0), into points mapped in the current receiver coordinate system (RCS1), and new point positions are mapped in the current receiver coordinate system (RCS1) without transformation. The resulting point (Point0) is then mapped to the display 112 in the mobile station 100.

Figure 6:
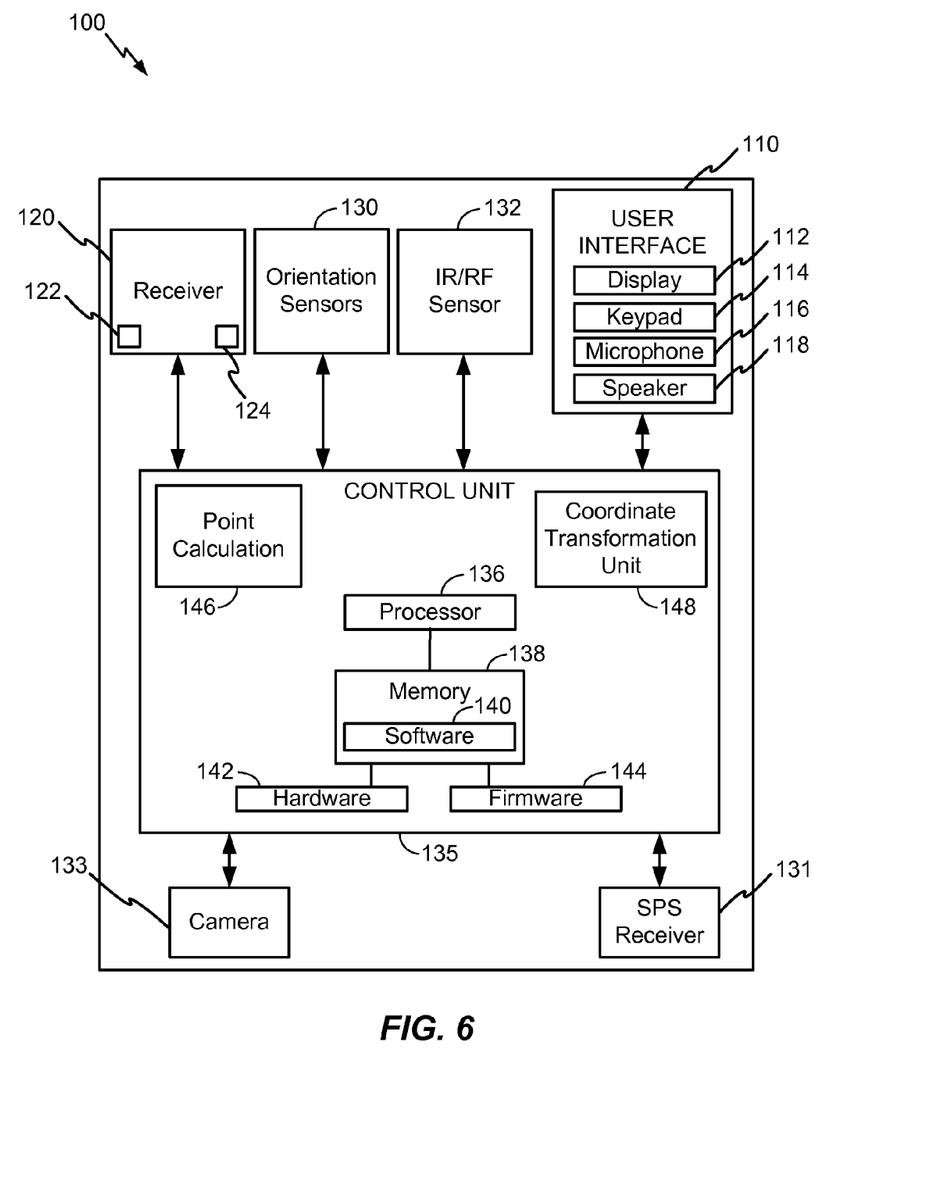
FIG. 6 is a block diagram of the mobile station that may be used with an electronic pen and an unattached work area.

FIG. 6 is a block diagram of the mobile station 100 that may be used with an electronic pen 150 and an unattached work area 160. Mobile station 100 includes receiver 120, which may include two or more microphones 122, 124 capable of receiving acoustic, e.g., ultrasonic, signals, from the electronic pen 150. The mobile station also includes orientation sensors 130, which may be accelerometers and/or gyroscopes, to detect movement of the mobile station 100, and thus, the receiver 120. The mobile station may also include an IR or RF receiver 132 for receiving IR/RF signals from the electronic pen 150 providing telemetry information and/or a time stamp.

The acoustic receiver 120, orientation sensors 130, and IR/RF receiver 132, if used, are connected to and communicate with a mobile station control unit 135. The mobile station control unit 135 accepts and processes data from the acoustic receiver 120, orientation sensors 130, and IR/RF receiver 132. The mobile station control unit 135 may be provided by a processor 136 and associated memory 138, software 140, hardware 142, and firmware 144. The mobile station control unit 135 includes a point calculation unit 146, which calculates and maps the position of the acoustic transmitter 152 on the electronic pen 150 based on the acoustic signals received by the acoustic receiver 120. The mobile station control unit further includes a coordinate transformation unit 148, which generates a transformation matrix from an initial receiver coordinate system (RCS0) to a new receiver coordinate system (RCS1) and provides the transformation matrix to the point calculation unit 146 for use in calculating and mapping the point position of the acoustic transmitter 152. It should be understood that the point calculation unit 146 and coordinate transformation unit 148 are illustrated separately from processor 136 for clarity, but may implanted using software 140 that is run in the processor 136, or in hardware 142 or firmware 144. It will be understood as used herein that the processor 136 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile station, and is not to be limited to any particular type of memory or number of memories, or type of media upon which memory is stored.

The mobile station 100 also includes a user interface 110 that is in communication with the mobile station control unit 135, e.g., the mobile station control unit 135 accepts data from and controls the user interface 110. The user interface 110 includes a display 112, as well as a keypad 114 or other input device through which the user can input information into the mobile station 100. In one embodiment, the keypad 114 may be integrated into the display 112, such as a touch screen display. The user interface 110 may also include a microphone 116 and speaker 118, e.g., when the mobile station 100 is a cellular telephone. If desired, the microphone 116 may be combined with one or more of the acoustic receiver microphones 122, 124.

The mobile station 100 may additionally include additional systems coupled to control unit 135, such as a camera 133 or a satellite positioning system (SPS) receiver 131 that receives signals from SPS satellites to be used to determine the position of the mobile station 100. A satellite positioning system (SPS) that may be used with the mobile platform 100 typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, position determination of the mobile platform 100, if used, is not restricted to using global systems (e.g., GNSS) for SPS. For example, other various regional systems may be used, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The methodologies described herein may be implemented by various means depending upon the application. For example, these methodologies may be implemented in hardware 142, firmware144, software 140, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 138 and executed by the processor 136. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

For example, software 140 codes may be stored in memory 138 and executed by the processor 136 and may be used to run the processor and to control the operation of the mobile station 100 as described herein. A program code stored in a computer-readable medium, such as memory 138, may include program code to calibrate the position of the acoustic receiver 120 with respect to a work area 160, e.g., based on acoustic signals received from an acoustic transmitter at predefined points in the work area 160. The program code stored in a computer-readable medium may further include program code to generate a transformation matrix using data from the orientation sensors 130 to correct for movement of the acoustic receiver 120 with respect to the work area 160, program code to determine and map the position of the acoustic transmitter 152 with respect to the work area 160 using acoustic signals received by the acoustic receiver 120 and the transformation matrix, and program code to display the mapped position of the acoustic transmitter 152 in the display 112.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The mobile station 100, thus, includes a means for calibrating the position of the acoustic receiver 120 with respect to a work area 160, which may implemented by the acoustic receiver 120 in conjunction with the point calculation unit 146, which may be embodied in hardware 142, firmware 144, or in software 140 run in the processor 136 or some combination thereof. The mobile station further includes means for compensating for movement of the acoustic receiver 120 with respect to the work area 160, which may be implemented by the orientation sensors 130 in conjunction with the coordinate transformation unit 148, which may be embodied using hardware 142, firmware 144, or in software 140 run in the processor 136 or some combination thereof. The means for compensating may include means for detecting movement of the acoustic receiver, which may be implemented by accelerometers and/or gyroscopes in the orientation sensors 130, and means for generating a transformation matrix from the calibrated position to a new position using the means for detecting movement, which may be the coordinate transformation unit 148, which may be embodied using hardware 142, firmware 144, or in software 140 run in the processor 136 or some combination thereof. The mobile station may further includes means for calculating and mapping the position of the acoustic transmitter 152 with respect to the work area 160 using received acoustic signals from the acoustic transmitter 152 and the means for compensating for movement of the acoustic receiver with respect to the work area, which may be implemented by the point calculation unit 146, which may be embodied using hardware 142, firmware 144, or in software 140 run in the processor 136 or some combination thereof. Further, the mobile station may include means for displaying the mapped position of the acoustic transmitter 152, which may be implemented by the display 112, as well as using hardware 142, firmware 144, or in software 140 run in the processor 136 or some combination thereof.

Figure 7:
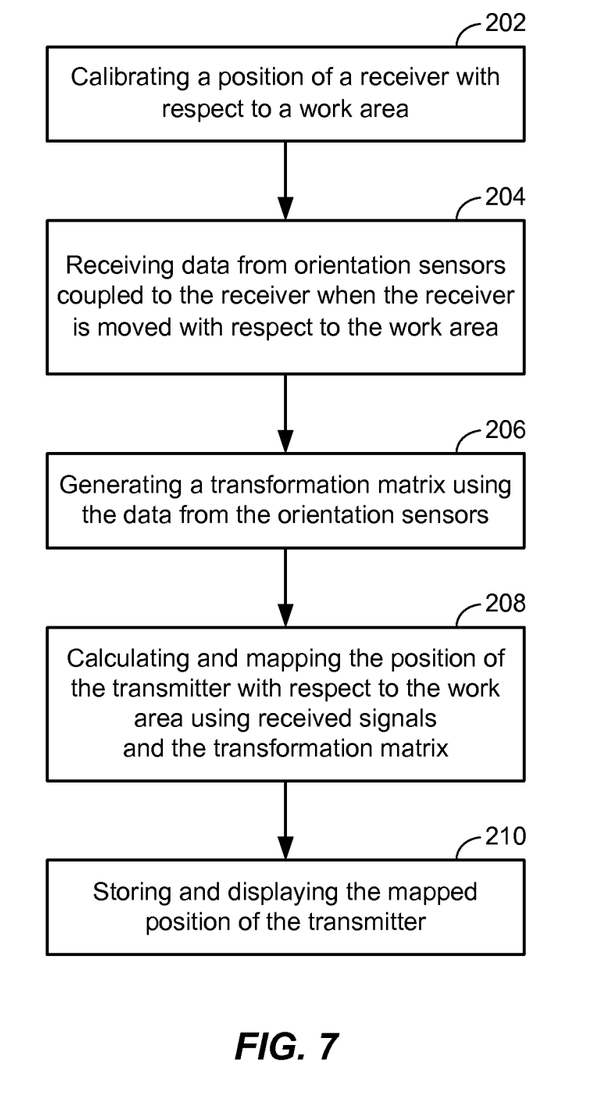
FIG. 7 is a flow chart showing a method of using a mobile station with an electronic pen and an unattached work area.

FIG. 7 is a flow chart showing a method of using the mobile station 100 with an electronic pen 150 and an unattached work area 160. After positioning the work area 160 and the mobile station 100, the position of the receiver 120 in the mobile station 100 is calibrated with respect to the work area 160 (202). The size of the work area 160 may be simultaneously calibrated as well. Calibration may be performed by sequentially pointing the electronic pen 150 at predefined points in the work area 160, such as the four corners and center of the work area 160. The calibration process establishes the initial receiver coordinate system (RCS0) for the receiver relative to the work area 160. With the initial receiver coordinate system (RCS0) established, the receiver 120 can receive signals, such as acoustic or electromagnetic signals, from the electronic pen 150 from which the mobile station can determine the position of the electronic pen 150 using the initial receiver coordinate system (RCS0) and map the position in the display 112.

When the mobile station 100 is moved with respect to the work area 160, data is received from orientation sensors that are located in the mobile station 100 along with the receiver 120 (204). If desired, the mapping of the position of the transmitter 152 may be disabled during movement of the mobile station 100, such as during large magnitude movement. Once the mobile station is in a steady state, e.g., no longer moving or no longer subject to large magnitude movement, as indicated by the orientation sensors, the received data from the orientation sensors is used to generate a transformation matrix (T1_0) between the new receiver coordinate system (RCS1) and the initial receiver coordinate system (RCS0) (206). The transformation matrix may be generated based, e.g., on Euler's rotation theorem, in which any rotation is described using three angles. According to Euler's theorem, if rotations are written in terms of a rotation matrices, D, C, and B, a general rotation A can be written as $$A = BCD \qquad \text{eq. 1}$$

$$A = \begin{pmatrix} a_{11} & a_{12} & a_{13} \\ a_{21} & a_{22} & a_{23} \\ a_{31} & a_{32} & a_{33} \end{pmatrix}. \qquad \text{eq. 2}$$

Based on the "x, y, z (pitch-roll-yaw) convention", where $\theta$ is pitch, $\psi$ is roll, and $\phi$ is yaw, the rotation matrices D, C, and B, may be written as:

$$D \equiv \begin{pmatrix} \cos\phi & \sin\phi & 0 \\ -\sin\phi & \cos\phi & 0 \\ 0 & 0 & 1 \end{pmatrix} \qquad \text{eq. 3}$$

$$C \equiv \begin{pmatrix} \cos\theta & 0 & -\sin\theta \\ 0 & 1 & 0 \\ \sin\theta & 0 & \cos\theta \end{pmatrix} \qquad \text{eq. 4}$$

$$B \equiv \begin{pmatrix} 1 & 0 & 0 \\ 0 & \cos\psi & \sin\psi \\ 0 & -\sin\psi & \cos\psi \end{pmatrix}. \qquad \text{eq. 5}$$

The matrix A is then given by:

$a_{11} = \cos\theta \cos\phi;$ $a_{12} = \cos\theta \sin\phi;$ $a_{13} = -\sin\theta;$ $a_{21} = \sin \psi \sin \theta \cos \phi - \cos \psi \sin \phi;$ $a_{22} = \sin \psi \sin \theta \sin \phi - \cos \psi \cos \phi;$ $a_{23} = \cos \theta \sin \psi;$ $a_{31} = \cos \psi \sin \theta \cos \phi - \sin \psi \sin \phi;$ $a_{32} = \cos \psi \sin \theta \sin \phi - \sin \psi \cos \phi;$ $a_{33} = \cos \theta \cos \psi.$  eq. 6

Of course, if desired, the transformation matrix (T1_0) may be generated using other mathematically equivalent conventions. Moreover, the transformation matrix may generated in more simplistically based on the assumption that movement between the acoustic receiver 120 and the work area 160 will be one dimensional, i.e., only "yaw" angle $\phi$ may vary, and the other two dimensions, pitch $\theta$ and roll $\psi$, will not vary.

The acoustic receiver 120 can then receive acoustic signals from the acoustic transmitter 152 in the electronic pen 150 and the mobile station 100 can calculate and map the position of the acoustic transmitter 152 with respect to the unattached work area 160 using the received acoustic signals and the transformation matrix (208). For example, the transformation matrix (T1_0) may be used to convert a calculated point position (Point1) that is in the new receiver coordinate system (RCS1) to a point position (Point0) in the initial receiver coordinate system (RCS0), i.e., Point0=T1_0*Point1. The corrected point position is then provided to the mobile station 100 graphical user interface for sequential handling to be stored and mapped to the display (210).

Alternatively, if desired, the transformation matrix (T1_0) may be used to convert the previously mapped point positions (Points0) that are in the initial receiver coordinate system (RCS0) to point positions (Points 1) in the new receiver coordinate (RCS1), i.e., Point1=Point0/T1_0. The newly calculated point positions (Point1) can then be provided to the mobile station 100 graphical user interface for sequential handling to be stored and mapped to the display (210).

If the mobile station 100 is moved with respect to the work area 160 again, the process is repeated, i.e., the data received from the orientation sensors (204) is used to generate a new transformation matrix (T2_0) (206), which can be used to correct for change in position of the acoustic receiver 120 (208).

Additionally, extraneous sources of movement of the mobile station 100 may be detected based on signals from orientation sensors 130 in the mobile station 100 and compensated for. By way of example, when the mobile station 100 and electronic pen 150 are used in a vehicle, movement of the mobile station 100 due to the extraneous source may be detected and the effects that the extraneous motion has on the mapped position of the transmitter may then be corrected. Moreover, with an orientation sensor, such as accelerometer 158, in the electronic pen 150, extraneous sources of movement of the electronic pen 150, e.g., vibration or jitter caused by a vehicle or other source, may be detected and compensated for. The signals from the orientation sensors 130 and/or 158 may be compared to appropriate frequency and/or magnitude thresholds to detect movement indicative of an extraneous source. Further, the signals from the orientation sensors 130 and 158 in the mobile station 100 and electronic pen 150 may be compared to each other to determine a common extraneous source of movement. The signals from the orientation sensors 130 and/or 158 that indicate an extraneous source of movement may then be used to filter out the movement or correct for the movement in the mapped position of the transmitter 152.

Additionally, the position of the electronic pen 150 may be determined with respect to an external reference frame, such as a global reference frame. By way of example, the position of the mobile station 100 may be known with respect to the external reference frame using orientation sensors 130, and the position of the electronic pen 150 is known with respect to the mobile station 100, as discussed herein. Accordingly, the position of the electronic pen 150 may be determined with respect to the external reference frame. In one embodiment, the external reference frame may be a global reference frame, e.g., as defined by a satellite position system, where the position of the mobile station 100 is known in the global reference frame using SPS receiver 131, as well as orientation sensors 130. Thus, the position of the electronic pen 150 may be with respect to the global reference frame.

Moreover, in addition to the distance from the mobile station 100, the orientation of the electronic pen 150 may also be determined with respect to the mobile station 100 so that the relative disposition of the electronic pen 150 is known. For example, using orientation sensors 158, which may be accelerometers, as well as compass, or gyroscopes, may be used to indicate the orientation of the electronic pen 150 with respect to the mobile station. Further, a camera 133 in the mobile station 100 may be used to identify the orientation of the electronic pen 150 using, e.g., object recognition or one or more light emitting diodes 155 (FIG. 3) or other types of beacons, such as an IR transmitter 154 (FIG. 3), that may be mounted on the electronic pen 150. If desired, the orientation of the electronic pen 150 may be determined a combination of the above-described sensors or additional or alternative sensors.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   receiving acoustic signals, emitted by a transducer, with a receiver, the transducer being included in a transmitter unit of an electronic pen, the electronic pen being configured to engage a work area of a writing surface that is unattached to the receiver, one or both of the work area and the receiver being subject to extraneous sources causing a relative movement of the receiver with respect to the work area;
   after defining an initial position of the receiver relative to the work area, receiving data from orientation sensors coupled to the receiver, the orientation sensors being configured to detect a movement of the receiver;
   detecting a change in the position of the receiver relative to the work area using the data from the orientation sensors;
   calculating and mapping a position of the transmitter with respect to the work area using the received acoustic signals and a transformation matrix, the transformation matrix being generated according to the change in the position of the receiver relative to the work area and being configured to correct for the relative movement of the receiver with respect to the work area; and displaying the mapped position of the transmitter with respect to the work area.

2. The method of claim 1, wherein the receiver and the orientation sensors are in a mobile station.

3. The method of claim 1, wherein the electronic pen is a writing instrument.

4. The method of claim 3, further comprising receiving orientation signals for an orientation of the writing instrument and using the orientation signals to determine that the writing instrument is in use.

5. The method of claim 1, further comprising receiving orientation signals for an orientation of the transmitter and using the orientation signals to determine the orientation of the transmitter with respect to the receiver.

6. The method of claim 5, further comprising determining the position of the receiver in an external reference frame and determining the position of the transmitter in the external reference frame using the orientation of the transmitter with respect to the receiver and the position of the receiver in the external reference frame.

7. The method of claim 1, wherein the orientation sensors are accelerometers.

8. The method of claim 1, wherein the receiver is an acoustic receiver and the transmitter is an acoustic transmitter.

9. The method of claim 8, wherein the acoustic receiver receives ultrasonic signals.

10. The method of claim 1, further comprising:
generating a second transformation matrix using the received data from the orientation sensors to correct for additional movement of the receiver with respect to the work area;
calculating and mapping the position of the transmitter with respect to the work area using received signals from the transmitter on the transmitter and the second transformation matrix; and
displaying the mapped position of the transmitter.

11. The method of claim 1, further comprising:
defining the initial position of the receiver by performing a calibration procedure in which an initial receiver coordinate system is established relative to the work area; and
establishing a new receiver coordinate system in response to the detecting of the change in the position of the receiver relative to the work area, wherein the transformation matrix is used to transform a calculated position of the transmitter in the new receiver coordinate system into the position of the transmitter in the initial receiver coordinate system.

12. The method of claim 1, further comprising:
defining the initial position of the receiver by performing a calibration procedure in which an initial receiver coordinate system is established relative to the work area; and
establishing a new receiver coordinate system in response to the detecting of the change in the position of the receiver relative to the work area, wherein the transformation matrix is used to transform previously calculated positions of the transmitter in the initial receiver coordinate system into positions in the new receiver coordinate system.

13. An apparatus comprising:
a receiver for receiving acoustic signals, emitted by a transducer, with a receiver, the transducer being included in a transmitter unit of an electronic pen, the electronic pen being configured to engage a work area of a writing surface that is unattached to the receiver;
orientation sensors, coupled with the receiver, for detecting a movement of the receiver with respect to the work area;
a display;
a processor connected to the receiver, the orientation sensors and the display; memory connected to the processor; and
software held in the memory and run in the processor to cause the processor to:
define an initial position of the receiver relative to the work area;
detect a change in the position of the receiver relative to the work area using the data from the orientation sensors;
calculate and map a position of the transmitter with respect to the work area using the received acoustic signals and a transformation matrix, the transformation matrix being generated according to the change in the position of the receiver relative to the work area and being configured to correct for the movement of the receiver with respect to the work area; and
display the mapped position of the transmitter with respect to the work area, in the display.

14. The mobile station of claim 13, wherein the electronic pen is a writing instrument.

15. The mobile station of claim 14, wherein signals from the transmitter comprises orientation signals for the orientation of the writing instrument, wherein the software causes the processor to use the received orientation signals to determine that the writing instrument is in use.

16. The mobile station of claim 13, wherein signals from the transmitter comprises orientation signals for the orientation of the transmitter, wherein the software causes the processor to use the received orientation signals to determine the orientation of the transmitter with respect to the receiver.

17. The mobile station of claim 16, further comprising a satellite positioning system receiver coupled to provide received satellite positioning system signals to the processor, wherein the software causes the processor to use the received satellite positioning system signals to determine the position of the receiver in an external reference frame, the software further causes the processor to determine the position of the transmitter in the external reference frame using the orientation of the transmitter with respect to the receiver and the position of the receiver in the external reference frame.

18. The mobile station of claim 13, wherein the orientation sensors are accelerometers.

19. The mobile station of claim 13, wherein the receiver is an acoustic receiver and the transmitter is an acoustic transmitter.

20. The mobile station of claim 19, wherein the acoustic receiver receives ultrasonic signals.

21. The mobile station of claim 13, wherein the software held in the memory and run in the processor causes the processor to discontinue calculating and mapping the position of the transmitter while the receiver is moving with respect to the work area.

22. The mobile station of claim 13, wherein the software held in the memory and run in the processor causes the processor to generate a second transformation matrix using the data from the orientation sensors to correct for additional movement of the receiver with respect to the work area; calculate and map the position of the transmitter with respect to the work area using received signals from the transmitter and the second transformation matrix; and display the mapped position of the transmitter in the display.

23. The mobile station of claim 13, wherein the software held in the memory and run in the processor causes the processor to:
define the initial position of the receiver by performing a calibration procedure in which an initial receiver coordinate system is established relative to the work area;
establish a new receiver coordinate system in response to the detecting of the change in the position of the receiver relative to the work area; and
use the transformation matrix to transform a calculated position of the transmitter in the new receiver coordinate system into the position of the transmitter in the initial receiver coordinate system.

24. The mobile station of claim 13, wherein the software held in the memory and run in the processor causes the processor to:
define the initial position of the receiver by performing a calibration procedure in which an initial receiver coordinate system is established relative to the work area;
establish a new receiver coordinate system in response to the detecting of the change in the position of the receiver relative to the work area; and
use the transformation matrix to transform previously calculated positions of the transmitter in the initial receiver coordinate system into positions in the new receiver coordinate system.

25. A system comprising:
a receiver for receiving acoustic signals, emitted by a transducer, with a receiver, the transducer being included in a transmitter unit of an electronic pen, the electronic pen being configured to engage a work area of a writing surface that is unattached to the receiver one or both of the work area and the receiver being subject to extraneous sources causing a relative movement of the receiver with respect to the work area;
a processor connected to the receiver and receiving data from orientation sensors coupled to the receiver, the orientation sensors being configured to detect movement of the receiver with respect to the work area of the writing surface;
memory connected to the processor; and
software held in the memory and run in the processor to cause the processor to:
define an initial position of the receiver relative to the work area;
detect a change in the position of the receiver relative to the work area using the data from the orientation sensors; and
calculate and map a position of the transmitter with respect to the work area using the received acoustic signals and a transformation matrix, the transformation matrix being generated according to the change in the position of the receiver relative to the work area and being configured to correct for the relative movement of the receiver with respect to the work area; and
means for displaying the mapped position of the transmitter with respect to the work area.

26. The system of claim 25, wherein:
the sensors are configured to detect movement of the receiver.

27. The system of claim 25, wherein the electronic pen is a writing instrument.

28. The system of claim 25, wherein the receiver is an acoustic receiver and the transmitter is an acoustic transmitter.

29. The system of claim 28, wherein the acoustic receiver receives ultrasonic signals.

30. A non-transitory computer-readable medium including program code stored thereon, comprising:
program code to calculate and map a position of a receiver with respect to a work area of a writing surface that is unattached to the receiver, one or both of the work area and the receiver being subject to extraneous sources causing a relative movement of the receiver with respect to the work area of the writing surface, the receiver being configured to receive acoustic signals, emitted by a transducer, the transducer being included in a transmitter of an electronic pen, the electronic pen being configured to engage the work area of the writing surface;
program code to define an initial position of the receiver relative to the work area;
program code to detect a change in the position of the receiver relative to the work area using data received from orientation sensors coupled to the receiver, the orientation sensors being configured to detect the relative movement of the receiver with respect to the work area of the writing surface;
program code to generate a transformation matrix according to the change in the position of the receiver relative to the work area, the transformation matrix being configured to correct for the relative movement of the receiver with respect to the work area;
program code to calculate and map the position of a transmitter with respect to the work area using the received acoustic signals and the transhformation matrix; and
program code to display the mapped position of the transmitter.

* * * * *

UNITED STATES PATENT AND TRADEMARK OFFICE
CERTIFICATE OF CORRECTION

PATENT NO. : 10,133,411 B2  
APPLICATION NO. : 12/814340  
DATED : November 20, 2018  
INVENTOR(S) : Baruch Eruchimovitch et al.

Page 1 of 1

It is certified that error appears in the above-identified patent and that said Letters Patent is hereby corrected as shown below:

In the Claims

In Column 12, Line 25, in Claim 14, delete "mobile station" and insert -- apparatus --, therefor.

In Column 12, Line 27, in Claim 15, delete "mobile station" and insert -- apparatus --, therefor.

In Column 12, Line 32, in Claim 16, delete "mobile station" and insert -- apparatus --, therefor.

In Column 12, Line 38, in Claim 17, delete "mobile station" and insert -- apparatus --, therefor.

In Column 12, Line 49, in Claim 18, delete "mobile station" and insert -- apparatus --, therefor.

In Column 12, Line 51, in Claim 19, delete "mobile station" and insert -- apparatus --, therefor.

In Column 12, Line 54, in Claim 20, delete "mobile station" and insert -- apparatus --, therefor.

In Column 12, Line 56, in Claim 21, delete "mobile station" and insert -- apparatus --, therefor.

In Column 12, Line 61, in Claim 22, delete "mobile station" and insert -- apparatus --, therefor.

In Column 13, Line 3, in Claim 23, delete "mobile station" and insert -- apparatus --, therefor.

In Column 13, Line 16, in Claim 24, delete "mobile station" and insert -- apparatus --, therefor.

In Column 14, Line 48, in Claim 30, delete "transhformation" and insert -- transformation --, therefor.

Signed and Sealed this  
Sixteenth Day of April, 2019

Andrei Iancu  
*Director of the United States Patent and Trademark Office*